(12) United States Patent
Fan

(10) Patent No.: US 10,151,294 B2
(45) Date of Patent: Dec. 11, 2018

(54) BUOYANT HOUSING DEVICE ENABLING LARGE-SCALE POWER EXTRACTION FROM FLUID CURRENT

(71) Applicant: Zhanfei Fan, Sugar Land, TX (US)

(72) Inventor: Zhanfei Fan, Sugar Land, TX (US)

( * ) Notice: Subject to any disclaimer, the term of this patent is extended or adjusted under 35 U.S.C. 154(b) by 217 days.

(21) Appl. No.: 15/179,041

(22) Filed: Jun. 10, 2016

(65) Prior Publication Data

US 2017/0356416 A1 Dec. 14, 2017

(51) Int. Cl.
*F03B 13/18* (2006.01)
*F03B 17/06* (2006.01)
*F03B 13/26* (2006.01)

(52) U.S. Cl.
CPC .......... *F03B 13/183* (2013.01); *F03B 13/264* (2013.01); *F03B 17/061* (2013.01); *F05B 2240/97* (2013.01); *F05B 2270/18* (2013.01); *F05B 2270/20* (2013.01)

(58) Field of Classification Search
CPC .... F03B 13/183; F03B 13/264; F03B 17/061; F05B 2240/97; F05B 2270/18; F05B 2270/20
See application file for complete search history.

(56) References Cited

U.S. PATENT DOCUMENTS

| 4,306,157 | A | 12/1981 | Wracsaricht | |
| 4,383,182 | A * | 5/1983 | Bowley | F03B 13/183 290/43 |
| 4,383,797 | A | 5/1983 | Lee | |
| 4,717,832 | A | 1/1988 | Harris | |
| 6,091,161 | A * | 7/2000 | Dehlsen | B63G 8/18 290/43 |
| 6,109,863 | A | 8/2000 | Milliken | |
| 6,531,788 | B2 | 3/2003 | Robson | |
| 6,856,036 | B2 | 2/2005 | Belinsky | |
| 7,105,942 | B2 * | 9/2006 | Henriksen | B63B 35/44 290/42 |
| 7,291,936 | B1 | 11/2007 | Robson | |
| 7,492,054 | B2 | 2/2009 | Caltin | |
| 7,541,688 | B2 | 6/2009 | Mackie | |
| 7,682,126 | B2 | 3/2010 | Parker | |
| 7,736,127 | B1 | 6/2010 | Carr | |
| 7,737,570 | B2 | 6/2010 | Costin | |
| 7,851,936 | B2 * | 12/2010 | Bolin | F03B 13/10 290/43 |

(Continued)

FOREIGN PATENT DOCUMENTS

EP 216261881 B1 9/2012
WO WO2012156717 A2 11/2012

*Primary Examiner* — Jason Shanske
*Assistant Examiner* — Matthew T Largi
(74) *Attorney, Agent, or Firm* — Ewing & Jones PLLC; Ira Domnitz

(57) ABSTRACT

A buoyant energy generating housing apparatus submersed in fluid currents. The disclosed embodiments comprises rotary turbines that harvest the kinetic energy in the currents, and buoys that house equipment and provide buoyancy to support the system. Movements and rotations are restrained by multiple cables or tendons that are anchored on the seabed, in combination with the internal active ballast system in the buoys. Applications in currents with direction change are possible with the use of two-buoy embodiments, further assisted by the optional use of weathervanes.

18 Claims, 8 Drawing Sheets

(56) References Cited

U.S. PATENT DOCUMENTS

| | | |
|---|---|---|
| 7,902,687 B2 | 3/2011 | Sauer et al. |
| 8,272,831 B2 | 9/2012 | Johnston |
| 8,344,535 B2 | 1/2013 | Pitre |
| 8,410,626 B2 | 4/2013 | Holstein et al. |
| 8,692,401 B2 | 4/2014 | Roddier et al. |
| 8,766,466 B2 | 7/2014 | Dehlsen et al. |
| 8,794,875 B2 | 8/2014 | Fraenkel |
| 8,956,103 B2 | 2/2015 | Gehring |
| 2005/0121917 A1* | 6/2005 | Kikuchi ............... F03B 17/061 290/53 |
| 2007/0231072 A1 | 10/2007 | Jennings et al. |
| 2008/0018115 A1 | 1/2008 | Orlov |
| 2008/0050933 A1 | 2/2008 | Mackie |
| 2009/0140524 A1 | 6/2009 | Kejha |
| 2010/0181774 A1* | 7/2010 | Dehlsen ................ B63B 21/50 290/54 |
| 2010/0230971 A1 | 9/2010 | Mackie |
| 2010/0326343 A1 | 12/2010 | Hunt |
| 2010/0327583 A1* | 12/2010 | Hunt ...................... B63B 21/50 290/43 |
| 2011/0131970 A1 | 6/2011 | Johnston et al. |
| 2012/0187693 A1* | 7/2012 | Houvener ............ F03B 17/061 290/54 |
| 2012/0211988 A1 | 8/2012 | Harding |
| 2013/0106105 A1* | 5/2013 | Dehlsen ............... F03B 17/061 290/43 |
| 2014/0137789 A1 | 5/2014 | Hewitt et al. |
| 2016/0017859 A1* | 1/2016 | Handa ................. F03B 13/264 60/496 |

\* cited by examiner

BUOYANT HOUSING DEVICE ENABLING LARGE-SCALE POWER EXTRACTION FROM FLUID CURRENT

CROSS-REFERENCE TO RELATED APPLICATIONS

Not applicable.

STATEMENT REGARDING FEDERALLY SPONSORED RESEARCH

Not applicable

BACKGROUND

Renewable energy plays a critical role in the world-wide efforts to reduce fossil fuel use and curtail pollutions and carbon-dioxide emissions. Presently, wind and solar dominate the development and deployment of the renewable energy. Another source of the renewables is the kinetic energy in the moving waters on our planet. Although water typically moves slower than wind, water is more than 800 times heavier than air, and therefore has high energy density when it moves. Traditional methods of harvesting hydraulic energy often involve the construction of dams in/on rivers in order to increase flow velocity, which alters the natural flow of rivers and impose major disruptions to the environmental and ecological system in nature.

A major hydrokinetic energy source that is largely untapped is the moving water in the ocean. Great amounts of kinetic energy exists in the form of waves, tides, and ocean currents. A wave is the movement of water on the sea surface due to wind. The tide is the movement of water due to the gravity interactions of the earth, the moon and the sun. Ocean currents are the long distance movement of ocean water due to wind, temperature gradient, rotation of the earth, sanity gradients, etc. The present invention is a device used for the power extraction from ocean currents, tidal streams, and other fluid currents.

In the past there have been many different devices proposed in prior art to harvest the kinetic energy in water currents involving hydraulic turbines with rotating blades. Different types of turbines have been developed and are commercially available. Generally, submerged hydraulic turbines can either have a horizontal axis or a vertical axis. In many forms, the present invention uses the turbine with a horizontal axis. In some forms, the invention is a buoyant device that includes the hydraulic turbine, and a new method to tether the device in the middle of the moving water current, so that electricity can be continuously and effectively generated.

In several embodiments, the present invention has several distinctions and advantages, which may include: 1) in several embodiments, the present invention has a buoyant device tethered by mooring cables/tendons that are preferably in high tension; 2) in several embodiments, the present invention is totally submerged in the water and stays below the ship traffic; 3) in several embodiments, the present invention has the rotary turbine with its axis parallel to water flow direction and its blades sweeping in the plane normal to the water flow direction; 4) in several embodiments, the present invention uses single rotary turbine, but can easily be modified to house multiple-rotor turbines; 5) in several embodiments, the present invention uses three or more, parallel, non-coplanar, equal-length tethering cables/tendons; 6) in several embodiments, the present invention uses differential tensions in multiple, spaced cables to resist rotational moments; 7) in several embodiments, the present invention uses CG eccentricity method from self-weight and/or water weight in internal active ballast system to counter balance rotational moments; 8) in several embodiments, the present invention has yaw rotational capability by using two buoys, one rotating and the other non-rotating; and 9) in several embodiments, the present invention utilizes a weathervane to increase sensitivity to currents' direction change.

US 2009/0140524 to Keijha discloses a device with a single mooring line and single rotor turbine, but without discussion on the control of levelness and the roll and pitch motions. The operating position, as well as positions in different water flow conditions, may be very different from what is shown in the drawing. Keijha does not disclose the use of multiple, parallel, non-coplanar, equal-length tethering cable; use of differential tensions in multiple, spaced cables to resist rotational moments; or use of CG eccentricity method from self-weight and/or water weight in internal active ballast system to counter balance rotational moments.

U.S. Pat. No. 7,737,570 to Costin discloses a device with a single mooring line and single rotor turbine. Costin depends on large and spread buoyant bodies and internal water tanks to provide stability for the device. The device of Costin is not completely submerged and there is a need to pump water in and out of the device. Costin does not disclose total submergence in the water; use of multiple, parallel, non-coplanar, equal-length tethering cables; use of differential tensions in multiple, spaced cables to resist rotational moments; use of yaw rotational capability by using two buoys, one rotating and the other non-rotating; or utilization of an optional weathervane.

US 2010/0327583 to Hunt discloses a device tethered at one single point. Therefore, the levelness and stationary position of the device is maintained through the adjustment of the CO location and the hydrodynamic wings in response to the flow speed change. In US 2010/0326343, Hunt discloses a mooring method with minimum two cables connected to a single point on the device. The two-cable system as shown in Hunt cannot handle large flow direction change. Hunt does not disclose use of multiple, parallel, non-coplanar, equal-length tethering cables; use of differential tensions in multiple, spaced cables to resist rotational moments; use of yaw rotational capability by using two buoys, one rotating and the other non-rotating; and use of optional weathervane.

U.S. Pat. No. 7,291,936 to Robson is similar to Hunt—US2010/0327583, except it uses twin counter-rotating rotor, single mooring cable. The ballast system is used to introduce pitch and adjust angle of attack to control the depth of the device. Robson does not disclose use of a single rotary turbine, not dual rotors with opposite spin direction; use of multiple, parallel, equal-length tethering cables; use of differential tensions in multiple, spaced cables to resist rotational moments; use of a yaw rotational capability by using two buoys, one rotating and the other non-rotating; and an optional weathervane.

U.S. Pat. No. 8,766,466 to Dehlsen discloses two or more counter-rotating rotor assemblies. Dehlsen is a multi-rotor device with nonparallel mooring lines. Dehlsen also discloses that the vertical mooring line will not be engaged all the time. Dehlsen discloses that the wing depressor is used to provide a downward force in fast current. Dehlsen does not disclose use of a single rotary turbine; use of multiple, parallel, non-coplanar, equal-length tethering cables; use of differential tensions in multiple, spaced cables to resist rotational moments; use of a yaw rotational capability by using two buoys, one rotating and the other non-rotating; optional use of a weathervane.

U.S. Pat. No. 7,541,688 to Mackie discloses a semi-submerged device, with a minimum of one surface piercing strut always staying above the water surface. It is therefore a fundamentally different device from the present invention, which is completely submerged. The extensive use of flaps, hydrofoil wings, and lateral thrusters as disclosed in Mackie would interrupt the flow and introduce large drag, reduce the efficiency of the device. Mackie does not disclose the use of multiple, parallel, non-coplanar, equal-length tethering cables; use of differential tensions in multiple, spaced cables to resist rotational moments; use of a CG eccentricity method from self-weight and/or water weight in internal active ballast system to counter balance rotational moments; use of yaw rotational capability by using two buoys, one rotating and the other non-rotating; or use of an optional weathervane.

US 2010/02309711 to Mackie discloses the use of mooring cables with different angles to create the so-called "geofixed" buoy at the prescribed depth, essentially a virtual seabed above the natural seabed to provide an anchor place for the tethered turbine. The geofixed buoy and the turbine are two parts separated by long cable or tendon. The proposed mooring method of Mackie may be strong in restraining the linear movements of the buoy, but not as strong in restraining rotations. In several embodiments, the present invention has a rotational part and a non-rotational part closely attached through a shaft to form one device. The non-rotational part is not fixed in space. Rather, it moves as the speed and direction of the current changes, and is strong in resisting pitch and roll rotations. In several embodiments of the present invention the mooring cables maintain parallel, and the device translates without rotation during movement with the water flow. Mackie does not disclose use of multiple, parallel, non-coplanar, equal-length tethering cables; use of differential tensions in multiple, spaced cables to resist rotational moments; rotational capability by using two buoys, one rotating and the other non-rotating; or use of an optional weathervane.

U.S. Pat. No. 7,492,054 to Catlin discloses a floating device used at the water surface of river/tidal stream, deployed in plurality and interconnected by cables. Catlin is mainly floating, unlike several embodiments of the present invention. Catlin does not address the issues facing a submerged device with single turbine. Catlin does not disclose: use of multiple, parallel, non-coplanar, equal-length tethering cables; use of differential tensions in multiple, spaced cables to resist rotational moments; use of CG eccentricity method from self-weight and/or water weight in internal active ballast system to counter balance rotational moments; us of yaw rotational capability by using two buoys, one rotating and the other non-rotating; or optional use of a weathervane.

U.S. Pat. No. 8,272,831 to Johnston discloses a device with two counter-rotating rotors. It is totally submerged in the water and stay below the ship traffic. Johnston does not disclose: use of a single rotary turbine; uses of multiple, parallel, non-coplanar, equal-length tethering cables; use of differential tensions in multiple, spaced cables to resist rotational moments; use of CG eccentricity method from self-weight and/or water weight in internal active ballast system to counter balance rotational moments; yaw rotational capability by using two buoys, one rotating and the other non-rotating; or optional use of weathervane.

U.S. Pat. No. 4,306,157 to Wracsaricht discloses devices primarily using solid stiff supports, but two of its embodiments do use tethering cables, which are not parallel. The turbine is suspended from the floats above, and the only possible way to provide a stiff support from the floats is to use high tensions in the suspension cables. However, it is difficult to do so without causing slack in other cables. There is no discussion on pitch and roll motion control, an important issue for all floating devices. The device of Wracsaricht is unable to rotate to align with the changing flow direction. Key differences from the present invention include: In several embodiments, the present invention uses multiple, parallel, non-coplanar, equal-length tethering cables. In several embodiments, the present invention uses CG eccentricity method from self-weight and/or water weight in internal active ballast system to counter balance rotational moments. In several embodiments, the present invention uses yaw rotational capability by using two buoys, one rotating and the other non-rotating. In several embodiments, the present invention utilizes a weathervane.

U.S. Pat. No. 6,109,863 to Milliken discloses a submersible buoyant apparatus using dual rotors with vertical axes. The vanes (blades) of the rotors consist of many sub vanes that can open and close in designated directions, and thus to drive the rotor to rotate as the current passes through the device. The global stability of the device, not the focus of the invention, is questionable as the device is fully submerged and using only one mooring cable. Key differences from the present invention include: In several embodiments, the present invention uses the rotary turbine that has its axis parallel to water flow direction and its blades sweeping in the plane normal to the water flow direction. In several embodiments, the present invention uses single rotary turbine, not dual rotors with opposite spin direction. In several embodiments, the present invention uses multiple, parallel, non-coplanar, equal-length tethering cables. In several embodiments, the present invention uses differential tensions in multiple, spaced cables to resist rotational moments. In several embodiments, the present invention uses CG eccentricity method from self-weight and/or water weight an internal active ballast system to counter balance rotational moments. In several embodiments, the present invention uses yaw rotational capability by using two buoys, one rotating and the other non-rotating. In several embodiments, the present invention utilizes a weathervane.

U.S. Pat. No. 6,531,788 to Robson discloses the use of a twin counter-rotating rotor, single mooring cable. In Robson, a ballast system is used to introduce pitch and adjust angle of attack to control the depth of the device. The Robson device does not disclose: In several embodiments, the present invention uses single rotary turbine, not dual rotors with opposite spin direction. In several embodiments, the present invention uses multiple, parallel, non-coplanar, equal-length tethering cables. In several embodiments, the present invention uses differential tensions in multiple, spaced cables to resist rotational moments. In several embodiments, the present invention uses yaw rotational capability by using two buoys, one rotating and the other non-rotating. In several embodiments, the present invention utilizes a weathervane.

U.S. Pat. No. 6,856,036 to Belinsky discloses a semi-submersible platform with a Darrieus type turbines (vertical axis) suspended under the platform to harvest the kinetic energy of the flowing current. The device of Belinski lacks: In several embodiments, the present invention is totally submerged in the water and stays below the ship traffic. In several embodiments, the present invention the rotary turbine has its axis parallel to water flow direction and its blades sweeping in the plane normal to the water flow direction. In several embodiments, the present invention uses single rotary turbine, not dual rotors with opposite spin direction. In several embodiments, the present invention uses multiple, parallel, non-coplanar, equal-length tethering cables. In several embodiments, the present invention uses differential tensions in multiple, spaced cables to resist rotational moments. In several embodiments, the present invention uses yaw rotational capability by using two buoys, one rotating and the other non-rotating. In several embodiments, the present invention utilizes a weathervane.

U.S. Pat. No. 7,682,126 to Parker discloses an airplane-like device with dual rotors and single mooring cable. Parker depends on ballast water for pitch and roll control. The device of Parker lacks: In several embodiments, the present invention uses single rotary turbine, not dual rotors with opposite spin direction. In several embodiments, the present invention uses multiple, parallel, non-coplanar, equal-length tethering cables. In several embodiments, the present invention uses tensions in multiple, spaced cables to resist rotational moments. In several embodiments, the present invention uses yaw rotational capability by using two buoys, one rotating and the other non-rotating. In several embodiments, the present invention utilizes a weathervane.

U.S. Pat. No. 7,902,687 to Sauer has the main focus of the invention on the parts and assembly of the modular device and generator. It is a different kind of turbine with many foil shaped blades on a horizontal axis perpendicular to the water flow. The device of Sauer is not able to rotate with the change flow direction, although flow reversal is claimed to be allowed. Sauer lacks: In several embodiments, the present invention the rotary turbine has its axis parallel to water flow direction and its blades sweeping in the plane normal to the water flow direction. In several embodiments, the present invention uses single rotary turbine, not dual rotors with opposite spin direction. In several embodiments, the present invention uses multiple, parallel, non-coplanar, equal-length tethering cables. In several embodiments, the present invention uses differential tensions in multiple, spaced cables to resist rotational moments. In several embodiments, the present invention uses CG eccentricity method from self-weight and/or water weight in internal active ballast system to counter balance rotational moments. In several embodiments, the present invention uses yaw rotational capability by using two buoys, one rotating and the other non-rotating. In several embodiments, the present invention utilizes a weathervane.

U.S. Pat. No. 8,344,535 to Pitre discloses a platform-like device on water surface extracts power from the moving fluids on which it floats. Pitre uses helicoids flights (screw-like threads) blades on dual turbines. Pitre lacks the following from the present invention: In several embodiments, the present invention is totally submerged in the water and stays below the ship traffic. In several embodiments, the present invention uses single rotary turbine, not dual rotors with opposite spin direction. In several embodiments, the present invention uses multiple, parallel, non-coplanar, equal-length tethering cables. In several embodiments, the present invention uses differential tensions in multiple, spaced cables to resist rotational moments. In several embodiments, the present invention uses CG eccentricity method from self-weight and/or water weight in internal active ballast system to counter balance rotational moments. In several embodiments, the present invention uses yaw rotational capability by using two buoys, one rotating and the other non-rotating. In several embodiments, the present invention utilizes a weathervane.

US 2007/0231072 to Jennings discloses a submersible planar platform, consisting of a number of impellors, to be secured in the water column by mooring cables. Jennings uses taut cables from the floor and to the water surface. Jennings lacks the following: In several embodiments, the present invention is totally submerged in the water and stays below the ship traffic. In several embodiments, the present invention uses single rotary turbine, not dual rotors with opposite spin direction. In several embodiments, the present invention uses multiple, parallel, non-coplanar, equal-length tethering cables. In several embodiments, the present invention uses differential tensions in multiple, spaced cables to resist rotational moments. In several embodiments, the present invention uses CG eccentricity method from self-weight and/or water weight in internal active ballast system to counter balance rotational moments. In several embodiments, the present invention uses yaw rotational capability by using two buoys, one rotating and the other non-rotating. In several embodiments, the present invention utilizes a weathervane.

US 2008/0018115 to Orlov discloses a semi-submersible platform for power harvesting from the ocean current partially above the sea surface and with dual turbines. The device of Orlov has no rotational capability. Orlov lacks the following: In several embodiments, the present invention is totally submerged in the water and stay below the ship traffic. In several embodiments, the present invention uses single rotary turbine, not dual rotors with opposite spin direction. In several embodiments, the present invention uses multiple, parallel, non-coplanar, equal-length tethering cables. In several embodiments, the present invention uses differential tensions in multiple, spaced cables to resist rotational moments. In several embodiments, the present invention uses CG eccentricity method from self-weight and/or water weight in internal active ballast system to counter balance rotational moments. In several embodiments, the present invention uses yaw rotational capability by using two buoys, one rotating and the other non-rotating. In several embodiments, the present invention utilizes a weathervane.

SUMMARY

In several embodiments of the present invention, the present invention operates under several parameters.

In several embodiments, the present invention is a buoyant power generation housing device that harvests power and generates electricity from water current. In some embodiments, the device is completely submersed under the water surface during operation. It consists of a single rotary turbine and a submerged, substantially hollow buoy. In some embodiments of the present invention, the rotary turbine has a plurality of rotational blades installed on a central shaft that is aligned to the water flow direction. The buoy houses the electricity generator, gear box, controller, and all other mechanical and electric parts for electricity generation and transmission as known in the art.

In some embodiments, during operation the entire device has net positive buoyancy, and is anchored to the seabed with three or more tethering cables or tendons. The tethering cables are substantially equal-length, parallel but non-coplanar, and of substantially equal resistance capacity. The tethering cables are mechanically attached to the secure anchors on the seabed. In some embodiments, when the water flows the device moves to and stay at a new position where new equilibrium is achieved. The movement is substantially translation with minimum rotation due to the mooring method disclosed. The differential tension forces in the spaced tethering cables provide the buoy with substantial rotational resistance.

In some embodiments of the present invention, the rotation blades located external to the buoy are in mechanical communication with the electricity generator in the buoy through the horizontal shaft. Electricity is generated in the normal manner in the generator when the shaft rotates driven by toque from the blades.

In some embodiments of the present invention, the submerged buoy can have different shapes and arrangements, all based on the same principles disclosed in this document. In some embodiments of the present invention, the submerged buoy consists of longitudinal and transverse cylindrical-shaped tubes, interconnected in a symmetric manner about the horizontal axis aligned to the water flow direction. In some embodiments of the present invention, the submerged buoy consists of substantially saucer shape.

In several embodiments of the present invention, the buoy contains water tanks or chambers and an internal active ballast system. The active ballast system moves water from lower water tanks to high water tanks after the buoy losses levelness. The resulting change of the CG location of the buoy and its content contributes to the counter balance of the applied moments on the buoy from the water flow and power harvesting.

In several embodiments of the present invention, the combined use of the differential tensions in the spaced tethering cables and the CG eccentricity of the buoy and its ballast water results in a substantially leveled, stationary, and stable housing buoy in the flowing water, enabling the continuous energy extraction and electricity generation from the water current.

In several embodiments of the present invention, the present invention comprises a fluid submersed energy generating housing apparatus comprising a first buoy with a substantially hollow interior, and a second buoy with a substantially hollow interior attached to the first buoy with the use of a vertical shaft. The second buoy is located on top of the first buoy, and is able to move in yaw rotation relative to the first buoy that does not rotate when it moves.

In several embodiments, the first buoy is tethered to the seabed anchors through three or more tethering cables or tendons. The tethering cables are substantially equal-length, parallel but non-coplanar, and of substantially equal resistance capacity.

In several embodiments, the rotary turbines with rotational blades are in communication with the second buoy through the horizontal shaft that is always aligned to current flow direction and extended into the electricity generator. The second buoy houses the electricity generator, gear box, controller, and all other mechanical and electric parts for electricity generation and transmission as known in the art.

In several embodiments, when the water flow change direction the second buoy can rotate accordingly to align its longitudinal direction to the water flow direction. The turbine blades are therefore able to rotate in the plane substantially normal to the water flow direction.

In several embodiments of the present invention, the first buoy contains water tanks or chambers and an internal active ballast system. The active ballast system moves water from lower water tanks to high water tanks when the first buoy losses levelness. The resulting change of the CG location of the first buoy and its content contributes to the counter balance the applied moments on the buoy from the water flow and power harvesting.

In several embodiments of the present invention, the combined use of the differential tensions in the spaced tethering cables and the CG eccentricity of the first buoy and its ballast water results in a substantially stationary, stable, and level housing buoy in the flowing water, enabling the continuous energy extraction and electricity generation of the device from the water currents.

In several embodiments, internal active ballast system can also be introduced inside the second buoy to help control the pitch motion of the second buoy. In some embodiments, the eccentric self-weight distribution in the transverse direction of the second buoy is used to control the roll motion caused by the rotary blades.

In several embodiments of the invention, in the two-buoy embodiments, a fluid weathervane is further attached distal to the second buoy and adjacent to the rotation blades. The use of weathervane increases the device's sensitivity to water flow's direction change and enable applications in flows with direction reversal such as in tidal streams. The use of weathervane also reduces vibration in the direction of yaw rotation during operation.

In several embodiments, the present invention is a fluid submersed energy generating housing apparatus comprising; a buoy with a substantially hollow interior; a rotary turbine comprising a body, rotation blades in communication with said body, and an axis in a substantially parallel direction to a fluid flow (wherein said body is housed within said buoy and said rotation blades in communication with said body); a mooring system comprising substantially equal length tethering cables wherein said tethering cables are substantially parallel and of substantially equal resistance capacity (said buoy being mechanically attached to said tethering cables); anchors mechanically attached with said tethering cables; and an active ballast system with chambers and pumps located in the hollow interior of said buoy (said active ballast system with chambers and pumps further comprising a water weight movement system in internal active ballast system to counter balance rotational moments of said buoy). In several embodiment of the invention said buoy with a substantially hollow interior is substantially saucer shaped. In several embodiments of the invention, said buoy with a substantially hollow interior comprises an assembly of substantially cylindrical shaped hollow sections. In several embodiments of the invention, said substantially equal length tethering cables comprise as least three in number. In several embodiments of said invention, said equal length tethering cables are arranged in a non-coplanar fashion. In several embodiments of the invention, said rotary turbine comprising blades and a body further comprises a multi armed body, with multiple turbines.

In several embodiments, the present invention, is a fluid submersed energy generating housing apparatus comprising; a first buoy with a substantially hollow interior, a second buoy with a substantially hollow interior attached in rotational and mechanical communication with the first buoy; a rotary turbine comprising body, rotation blades in communication with said body, and an axis in substantially parallel direction to a fluid flow (said body being housed within said second buoy and said rotation blades in communication with said body); a mooring system comprising substantially equal length tethering cables wherein said tethering cables are substantially parallel and of substantially equal resistance capacity (said first buoy being mechanically attached to said tethering cables); anchors mechanically attached with said tethering cables; and an active ballast system with chambers and pumps located in the hollow interior of said first and second buoys (said active ballast system with chambers and pumps further comprising a water weight movement system in internal active ballast system to counter balance rotational moments of said first buoy and second buoy). In several embodiments of the present invention, said first buoy with a substantially hollow interior is substantially saucer shaped. In several embodiments of the present invention, said second buoy with a substantially hollow interior is substantially cylindrical shaped. In several embodiments of the present invention, said second buoy with a substantially hollow interior is further comprised of a fluid weathervane attached to the exterior of said second buoy. In several embodiments of the present invention, said substantially equal length tethering cables comprise as least three in number. In several embodiments of the present invention, a fluid weathervane attached distal to said second buoy and adjacent to said rotation blades. In several embodiments of the present invention said equal length tethering cables are arranged in a non-coplanar fashion.

In several embodiments of the present invention, the present invention is a fluid submersed energy generating housing apparatus comprising; a first buoy with a substantially hollow interior; a second buoy with a substantially hollow interior attached in rotational and mechanical communication with the first buoy; a rotary turbine assembly comprising a body with arms, a plurality of rotation blades in communication with said rotary turbine assembly (said body with arms being partially housed within said second buoy and said plurality of rotation blades in communication with said rotary turbine assembly, in further communication with said body located external to said second buoy); a mooring system comprising substantially equal length tethering cables wherein said tethering cables are substantially parallel and of substantially equal resistance capacity (said first buoy being mechanically attached to said tethering cables; anchors mechanically attached with said tethering cables); an active ballast system with chambers and pumps located in the hollow interior of said first and second buoys (said active ballast system with chambers and pumps further comprising a water weight movement system in internal active ballast system to counter balance rotational moments of said first buoy and second buoy). In some embodiments, said first buoy with a substantially hollow interior is substantially saucer shaped. In some embodiments, said second buoy with a substantially hollow interior is substantially cylindrical shaped. In some embodiments, said second buoy with a substantially hollow interior is further comprised of a fluid weathervane attached to the exterior of said second buoy. In some embodiments, said substantially equal length tethering cables comprise as least three in number. In some embodiments, a fluid weathervane attached distal to said second buoy and adjacent to said rotation blades. In some embodiments, said equal length tethering cables are arranged in a non-coplanar fashion.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 2:
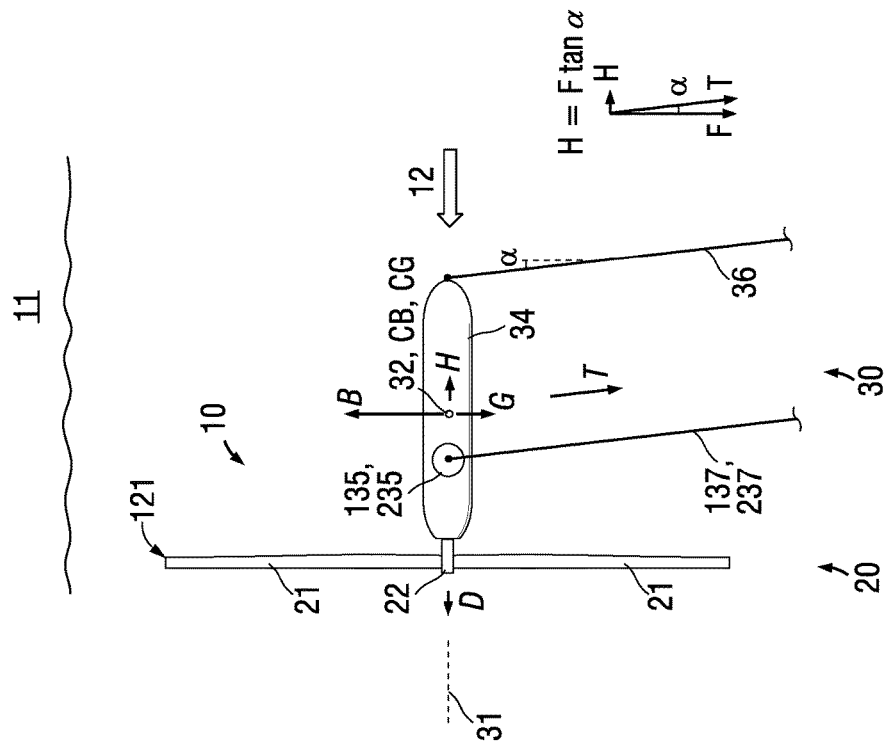
FIG. 2 illustrates one embodiment of the present invention in side view.

In the following description, certain details are set forth such as specific quantities, sizes, etc. . . . so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

One, or more, illustrative embodiments incorporating the invention disclosed herein are presented below. Applicants have created a revolutionary and novel buoyant device for power extraction from fluid current using tethering cables with high tension and method of use for the same.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. The following terms are defined for use in this application:

Buoy: an enclosure, sealed during operation, with substantially hollow interior and net positive buoyancy.

Buoy can be of large size to provide large buoyancy and large internal housing space for equipment, internal ballast system, etc.

CG Eccentricity: Refers to the scenario where the center of gravity (CG) of the buoy and its contents is not located on the vertical line that passes the center of buoyancy (CB). The offset or eccentricity is sometimes purposely introduced to counter balance the rotational moment the buoy is subject to.

Moment: A pair of forces with equal magnitude and opposite directions form a couple. The moment of a coupe is the product of the magnitude of the forces and their spacing. Moment causes an object to rotate in the same plane in which the opposite force couple occupies. Two parallel forces in the same direction but with different magnitudes contain a moment that is equal to the product of the spacing of the forces and their deviation to the average magnitude.

Seabed Anchor: Device with fixed location on the seabed, allowing connection to the tethering cables or tendons. It has adequate capacity to resist the pull-up forces from the tethering cable. It can comprise piles driven into the seabed soil/rock, or simply heavy blocks with large enough weight to overcome the buoyancy and maximum pull-up force.

Weathervane: A weathervane comprises a rod with one end rigidly connected to the yaw rotatable buoy and the other end free in the horizontal plane in the water. The free end is installed with a blade in the vertical plane so that any lateral pressure from water caused by the current direction change will force the weathervane to rotate. Rather than to point the current direction, the weathervane in this document is used to apply a rotational moment on the buoy to help it aligned to the current direction.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

Figure 1:
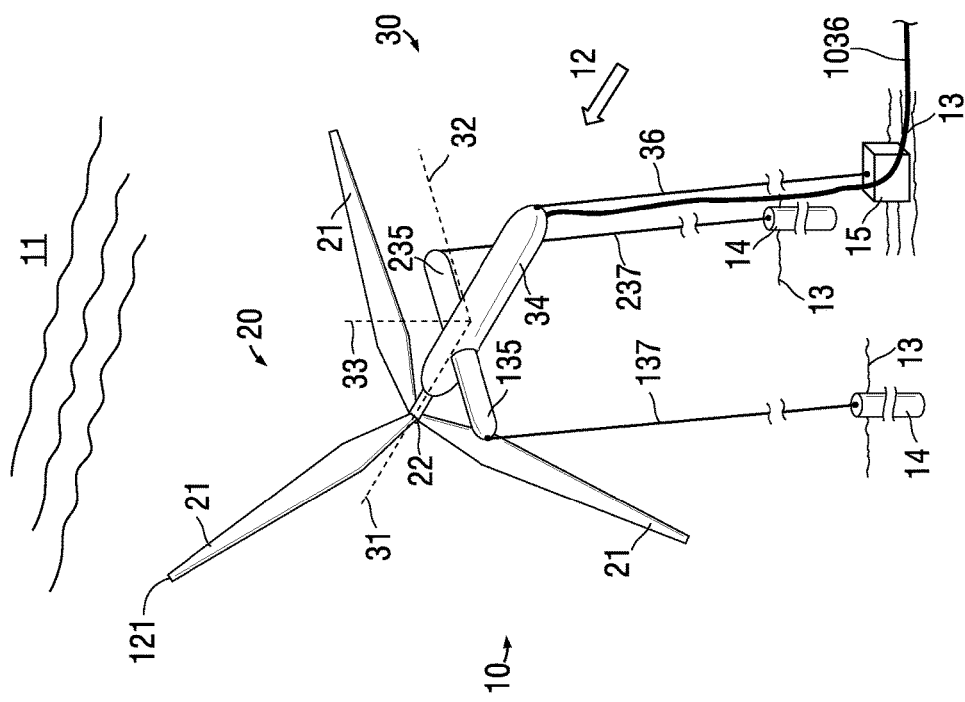
FIG. 1 illustrates one embodiment of the present invention in one quarter side view.
Figure 16:
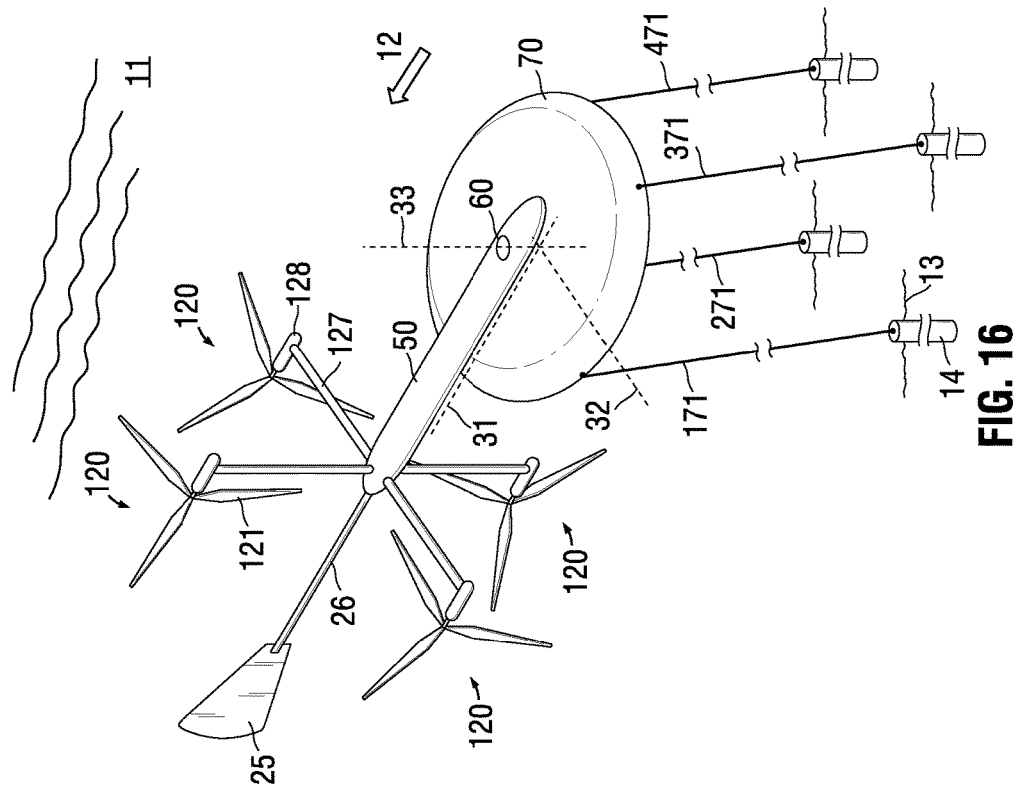
FIG. 16 illustrates one embodiment of the present invention in one quarter side view.

FIG. 1 illustrates one embodiment of the invention. In some embodiments, the invention is a buoyant power generation device 10 that harvests power and generates electricity from water current. As shown in this embodiment, the device 10 can be completely under the water surface 11 during operation. In some embodiments, the device 10 consists of a rotary turbine 20 and a stationary submerged buoy 30. In some embodiments the rotary turbine 20 has a plurality of rotational blades 21 installed on a central shaft 22 that can be aligned to the water flow direction 12. In several embodiments of the present invention, turbine 20 may be a turbine assemblies 120 and constructed in such a manner as to have multiple struts 127. See FIG. 16.

Buoy 30 may house the electricity generator, gear box, controller, and all other mechanical and electric parts for electricity generation and transmission as known in the art. These parts and equipment for underwater application are commercially available from vendors. The present invention enables larger scale underwater electricity generation and thus may stimulate the commercial manufacturers to develop larger capacity equipment to add to their product list. In several embodiments, the flow of water forces the blades 21 to turn, which drives the shaft 22 that extends into the generator located inside buoy 30 to spin. Electricity is generated as the shaft spins, in the normal manner used in other power generation occasions such as in the common wind turbines widely installed. In several embodiments, one aim of this invention is to disclose an effective method of building a stationary and stiff device or platform 10 placed under the water surface of the deep water region to house the electricity generating equipment.

In some embodiments, the stationary buoy 30 can have different shapes and arrangements. In several embodiments, two horizontal axes are introduced for buoy 30. The longitudinal axis 31 is preferably aligned to the direction of the flow of the water current 12. The transverse axis 32 is preferably perpendicular to the water flow direction 12. An additional vertical axis 33 can be introduced, which can be substantially perpendicular to the horizontal plane formed by axes 31 and 32.

As shown in FIG. 1, the submerged buoy 30 may consist of a longitudinal tube 34, and two transverse tubes, 135 on left side and 235 on the right side. Axis 31 may also be the longitudinal axis of tube 34, which therefore is aligned to the flow direction 12 during operation. In some embodiments, shaft 22 is extended into tube 34. Tubes 34 and 135, 235 are to be kept as much in the level position as possible during operation. In several embodiments, device 10 consists of hallow enclosed tubes 34, 135, 235 that house equipment and also provide buoyancy. The device 10 should possess sufficient strength to resist the large water pressure but preferably its self-weight should be kept as small as possible. Steel, aluminum, and other alloy and composite materials are the possible candidates for the tube plates and shells.

In some embodiments, during operation, the device 10 has net positive buoyancy, and is anchored to the seabed 13 with three or more tethering cables or tendons. In the three-cable configuration, as shown in FIG. 1, one cable 36 is connected to the longitudinal tube 34 at the upstream, and the other two cables 137 and 237 are connected to the ends of transverse tubes 135 and 235, respectively. In some embodiments, high pretensions in tethering cables 36, 137 and 237 are purposely introduced through the use of the large net buoyancy of device 10. In some embodiments, the tethering cables or tendons are anchored at the seabed 13 through the use of seabed anchors 14 or 15, which are devices with fixed locations on the seabed, and are able to remain fixed when subject to forces. The anchors provided in this application have the adequate capacity to resist the pull-up forces from the tethering cables. The anchors can be piles 14 driven to the seabed soil/rock, or simply heavy blocks 15 with sufficient weight to overcome the buoyancy and maximum pull-up force.

In some embodiments of the present invention, water flows in direction 12. Buoy 30 is located at the upstream side while the rotary turbine 20 is located at the downstream side. The flowing water current 12 drives the blades 21 and shaft 22 to rotate about the axis 31 while buoy 30 remains stationary. In this embodiment, power is generated and transmitted out using underwater power lines 1036, which can be (loosely) attached to the tethering cables near the device before connecting to the main transmission line.

In several embodiments, turbine 20 used in this invention has a horizontal central shaft 22 aligned to the direction of the water flow 12. In several embodiments, a single rotary turbine is used, which allows the use of long blades with a single-point support at the central shaft location. The support from buoy 30 to turbine 20 is sufficiently stiff and strong to resist the forces and moments on the turbine in all directions.

The single turbine configuration is most efficient in energy collecting due to its large sweeping area, but poses the greatest rotary torque loads on the device. Most discussions in this document will be focused on embodiments with single turbine installation. However, the same principles can be easily applied to the multi-turbine installations that are subject to smaller applied torques.

In several embodiments of the present invention, buoy 30 is stationary during operation. In some embodiments, buoy 30 contains ballast tanks that can be filled with water to make the whole system buoyancy negative during installation, as known in the art. However during operation, in some embodiments, the internal water content is reduced and buoy 30 has positive buoyancy. The blades 21 and shaft 22 may be designed and fabricated to be near buoyancy neutral, therefore the discussions on the buoyancy and the gravity in this document will be focused on the buoys only.

As shown in FIG. 2, in several embodiments, the center of buoyancy CB and the center of gravity CO of the buoy 30 is devised to be near the center of the triangle formed by the three end connection points of the tethering cables 36, 137, and 237. High pretensions can be purposely introduced in the tethering cables through the use of large buoyancy of buoy 30. The three cables have the equal length, and the locations of their anchors at the seabed mirror the connection points on buoy 30. The cables are therefore parallel.

In several embodiments, water flow not only causes the turbine 20 to spin about the longitudinal axis 31, it also drags the device 10 to move to a new position in the water flow direction 12. The horizontal drag force is resisted by the horizontal component of the tension forces in the tethering cables.

As shown in FIG. 2, in several embodiments, the tethering cables 36, 137 and 237 have equal length and are designed to stay in the vertical direction in still water. In moving water the device is pushed by the water flow 12 and will move horizontally as demonstrated in FIG. 2. During the movement, the weight and buoyancy of the buoy 30 do not change, and the high tensions in the mooring cables 36, 137, and 237 remain to be high. In some embodiments of the present invention, the cables will remain parallel to each other because of their equal length. The longitudinal tube 34 and shaft 22 will remain to be level during this movement in a steady and uniform flow condition. The tethering cables develop the same angle of tilt, a, in the new position in the moving water. The total tension force T of all tethering cables is aligned to the tilted cable direction.

In some embodiments of the present invention, the equilibrium in the vertical direction requires that the vertical component of T, denoted by F, i.e., $F=T \cos \alpha$, be equal to the difference between buoyancy B and the weigh G as shown earlier ($F=B-G$). The total horizontal component, H, of the total cable force in the new position is equal to F tan $\alpha$. Device 10 will cease to move once it reaches to the position at which the total drag force from the water flow, D, is equal to H. In this embodiment, buoy 30 will be stationary at this position as a state of equilibrium is achieved in the horizontal direction, while blades 21 spin continuously about axis 31 to generate the electricity.

In some embodiments of the present invention shown in FIGS. 1 and 2, the connecting points of the tethering cables 36, 137, and 237 are shown to be located at the elevation of shaft 22 in order to avoid the formation of an overturning moment from H and D, which causes pitch motion of tube 34. More disclosures on pitch motion control are provided later in this document.

At times, water current speed is usually highest at the depth in proximity to the water surface. It is therefore desired, in some embodiments to install the device in that high speed region for maximum energy harvesting. For example, in deep water ocean application device 10 can be installed at such depth that the tip 121 of blades 21, when at their highest position, is thirty meters below the sea surface 11. At this depth the device 10 stays clear of the majority of the navigational activities and avoid major wave forces at the sea surface. This desired location can result in a significant distance from device 10 to the seabed 13 to which the tethering cables are anchored. In some embodiments, cables 36 and 137, and 237 can be tens, hundreds or thousands of meters long. In some deep water application, large variation of the angle of tile $\alpha$ will cause significant position change for device 10 in both the horizontal and vertical directions. Angle $\alpha$ will be larger in faster moving current in order to provide a greater horizontal restraining force (H) to resist the greater drag (D) associated to the higher current speeds. In some embodiments of the present invention, variation in the depth of the device location in different water speeds should be kept small in order to capture the energy of the high speed current near the sea surface 11 while keeping the device within the safe water depth range under different flow speed conditions.

As shown in FIG. 2 a large horizontal restraining force H can be achieved by increasing either angle $\alpha$ or the total pretension F. High pretension through the use of large buoyance of buoy 30 is preferred in this invention. When high pretensions are present in the tethering cables, a small angle of tilt will produce a large enough change to horizontal force component H to counter balance the drag force change. With the high pretension, the tethering cables will need to tilt only a small angle from the vertical position during operation; its depth change in response to current speed change will be small.

The disclosed high pretension method is hence effective in the depth control and enables device 10 to stay within a small range of depth. In prior arts it was proposed to use hydrofoil wings or to adjust angle of attack for depth control. Those methods are problematic for the low flow speed application, and impose large disruption to the steady water current near the device that will compromise its efficiency and productivity.

Figure 3A:
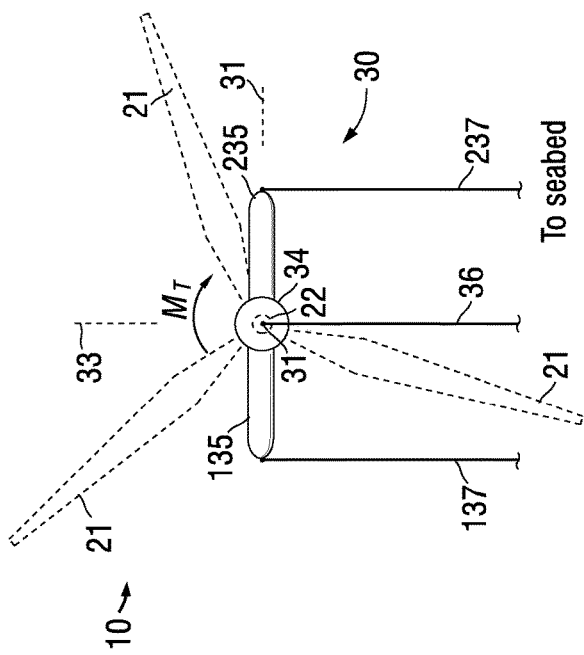
FIG. 3A illustrates one embodiment of the present invention from upstream without blades.
Figure 3B:
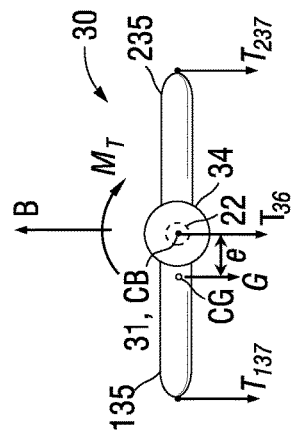
FIG. 3B illustrates one embodiment of the present invention from upstream without blades.

In some embodiments, when the current drives the blades 21 and shaft 22 to spin about axis 31, it also drives the buoy to spin about the same axis and causes the roll motion of tube 34. An overturning moment in the transverse vertical plane, $M_T$, is applied to buoy 30 from the rotating blades (FIGS. 3A and 3B). While spin of the blades is welcomed, spin of the buoy must be restrained in order for buoy 30 to remain stationary and device 10 to work properly. The moment $M_T$ must be counter balanced. A moment can only be countered by other moments in the same plane. A counter moment can be formed by two opposite force components spaced in the plane of rotation, equal to the product of the magnitude of the (opposite) forces and distance of their spacing. In several embodiments of the invention, two sources of force components are used to form the counter moments. One is the differential tensions in cables 137 and 237. The other is the opposite gravity and the buoyancy forces, by introducing an offset/eccentricity between the two to form a moment.

As shown in FIG. 3A, in some embodiments, the rotation of the buoy 30 about axis 31 is restrained by cables 137 and 237. Often in some embodiments, to hold a buoyant buoy 30 both cables 137 and 237 are in tension but at different levels when $M_T$ is present, with larger tension in cable 137 than that in cable 237 for the shown direction of $M_T$. The differential tensions, acting along with the spacing between the two cables, forms a counter moment that is in the opposite direction of the $M_T$.

It is the difference of the vertical components of the cable tensions (F in FIG. 2) that contributes to the counter balance of the $M_T$. The differential vertical forces result partly from the tension difference in the cables, and partly from the different tilt angles of the cables. For brevity the counter moment from the cable forces are generally being referred to as due to the differential cable tension forces throughout this document. It should be understood that whenever tension force change is called out for a tethering cable, it usually means that changes of both the tension force and the tilt angle occur to the cable.

In some embodiments, using the above differential cable force method alone to counter $M_T$ has limitations. In developing a higher vertical force from cable 137, tube 135 moves higher than tube 235, cable 137 has to be in a smaller angle of tilt than cable 237 due to the reason demonstrated in FIG. 2, which shows that a smaller angle α is associated with a higher cable top elevation. This cable angle difference of the two sides also causes the buoy to twist slightly about vertical axis 33, resulting in tube 235 to stay slightly ahead of the tube 135 in the flow direction 12. This twist about vertical axis 33 is not welcomed as it causes the blades to be in a plane not perpendicular to the water flow 12 and thus reduces the productivity of the device. The twist is small and acceptable if the overturning moment $M_T$ is not large.

A CG eccentricity method is based on the fact that in some embodiments, since the entire device is submerged in the water, the magnitude and the center of the buoyancy of the device do no change. In some embodiments the device is likely to have a symmetric shape, and therefore the CB is located at the geometric center of the surface shape. The force of the buoyancy is upward and the force of gravity is downward. If the weight of the device is so distributed that the CG is eccentric to the CB, a moment is formed between the gravity and the buoyancy. As shown in some embodiments in FIG. 3B, tubes 235 and 135 can be fabricated with different self-weights. An eccentricity between CG and CB, e, is purposely introduced. The resulting moment due to the eccentricity is used to counter the overturning moment $M_T$. Assume CB is in the central location, when the product of G and e equals $M_T$, the overturning moment is balanced by this CG eccentricity moment alone. The tension forces in cable 137 and 237 are equal, and no twist about the vertical axis 33 mentioned earlier will occur.

Figure 4:
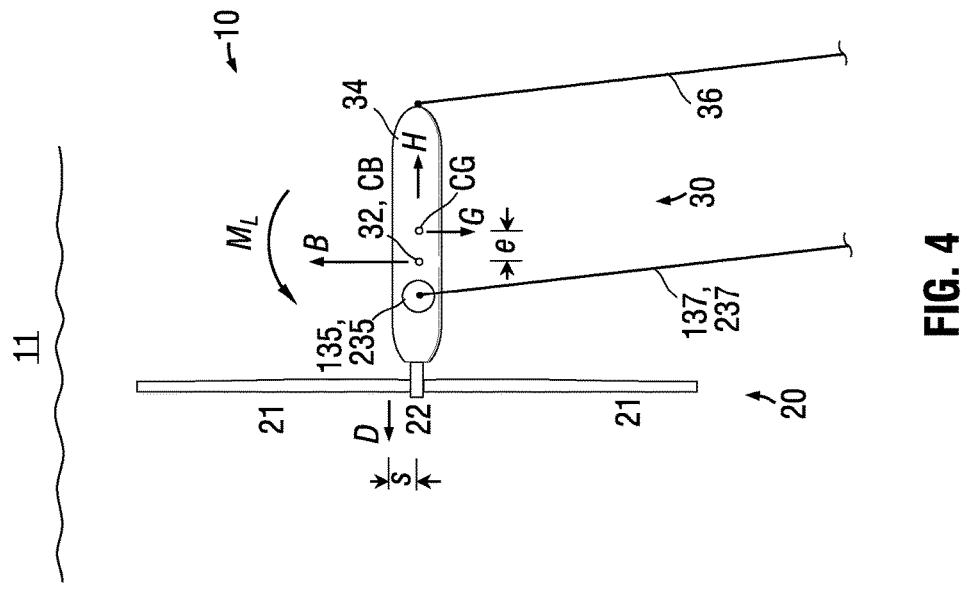
FIG. 4 illustrates one embodiment of the present invention in side view.

At times during operation the device is also subject to the overturning moment in the longitudinal plane, $M_L$, which causes the pitch motion as shown in FIG. 4. Moment $M_L$ may be developed due to the non-uniform distribution of the water speed in the vertical direction, which results in a total drag force D not located at the center of the turbine. The combined use of the cable differential tension method and the CG Eccentricity method to counter the rotary torque $M_T$ disclosed earlier can also be used to counter the $M_L$. As shown in FIG. 4, for a $M_L$ caused by a drag force above axis 32, cable 36 develops a larger tension than cable 137 and 237. The force difference between the front cables 137 and 237 and the rear cable 36, coupled with their spacing, forms a counter moment in the opposite direction of $M_L$. Similarly, if the CG of buoy 30 is not coincident to CB but rather is located in the back side of the CB as shown in FIG. 4, another counter moment due to the eccentricity e between the upward B and the downward G is formed to counter $M_L$.

Figure 5:
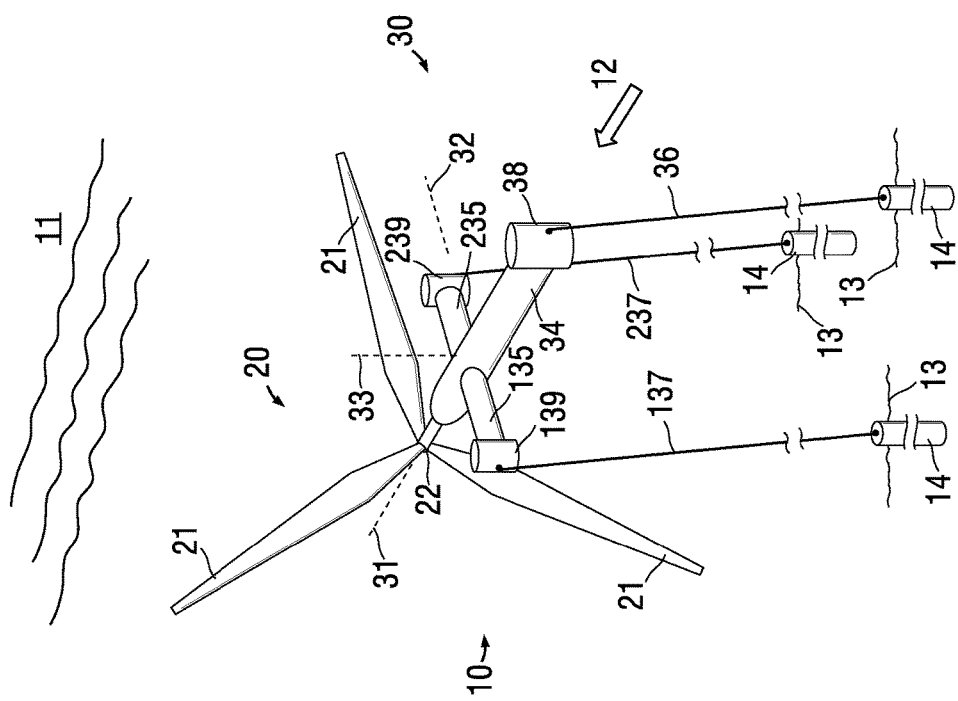
FIG. 5 illustrates one embodiment of the present invention in one quarter side view.

The eccentricities of CG just discussed are caused by the nonsymmetrical distribution of the material self-weight, and are therefore fixed in the transverse and longitudinal directions. The eccentricities can also be caused by contents inside the buoy and be variable with the use of the internal active ballast system. As demonstrated in FIG. 5, water tanks 38, 139 and 239 are installed at the ends of tubes 34, 135, and 235 respectively. An internal active ballast system is installed to move water between these water tanks. Levelness sensors are installed in buoy 30 in both the longitudinal and transverse directions. The water tanks 38, 139 and 239 are connected by water pipes with pumps and valves inside tubes 34, 135 and 235. If the slope of the buoy exceeds a preset threshold value, the internal pumps will be automatically activated and water will be pumped from the tank(s) at the lower elevation to the tank(s) at the higher elevation. The levelness of the buoy 30 will be restored.

In several embodiments, before the pumps are activated, the tethering cable connected to the water tank with the highest elevation has the greatest tension. As the pumps are activated and water moves to this highest tank, its elevation is lowered and the CG of the buoy 30 moves toward this side. The tension in the cable connected to this tank is reduced while the tension in the cable connected to the tank with outgoing water increases. This active ballast system can dynamically move the CG of the buoy 30 in both the longitudinal and horizontal directions. Therefore, it can provide the required CG eccentricity to counter both $M_T$ and $M_L$. In some embodiments of the present invention, an active ballast system with water tanks 38, 139 and 239 is used in combination with highly tensioned parallel tethering cables to control both the pitch and roll motions and to keep the buoy level in both the longitudinal and transverse directions.

Figure 6:
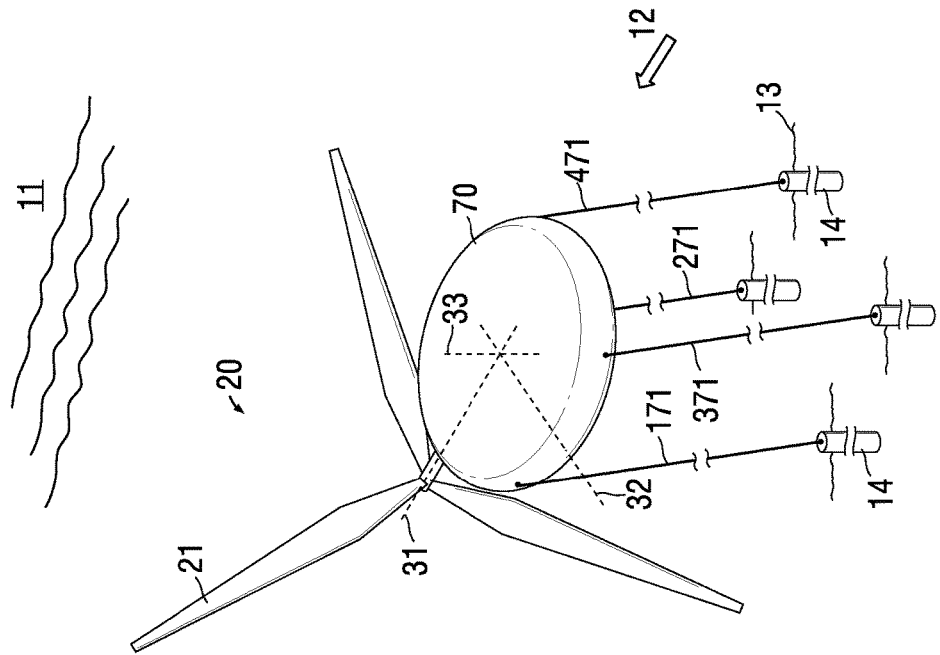
FIG. 6 illustrates one embodiment of the present invention in one quarter side view.

In some embodiments the water tanks can be built inside the buoy. FIG. 6 illustrates an embodiment of the invention in which buoy 70 has a circular disk shape with the disk plane positioned horizontally. As shown, four tethering cables that are tied to four points in a symmetric pattern at the outside edge of buoy 70. Cables 172 and 272 are located in the front of the buoy 70 while cables 371 and 471 are located in the back side of buoy 70

Figure 7:
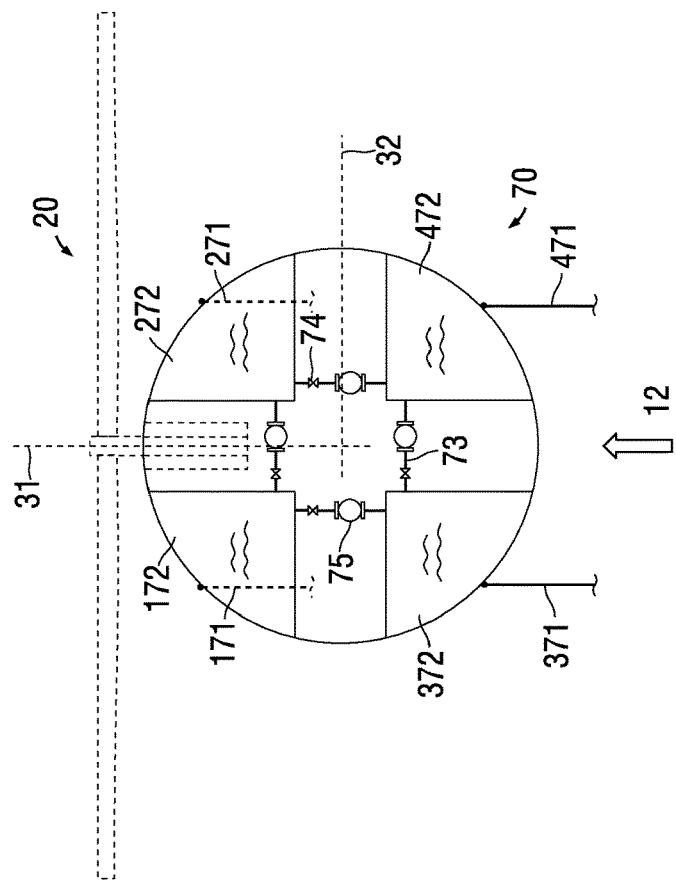
FIG. 7 illustrates one embodiment of the present invention in top view of partial cross section of the buoy.

FIG. 7 illustrated the top view of one embodiment of an internal partition of buoy 70 with four (4) chambers provided to store the ballast water. The front chambers are labeled 172 and 272 to which the connections to tethering cables 171 and 271 are attached. Similarly, the rear chambers are labeled 372 and 472 to which the connections to tethering cables 371 and 471 are attached. The chambers are interconnected by pipes 73 with control valves 74 and pumps 75. In many embodiments there are still sufficient open spaces inside buoy 70 and in the chambers to provide large buoyancy required to produce high tensions in the tethering cables.

Figure 8:
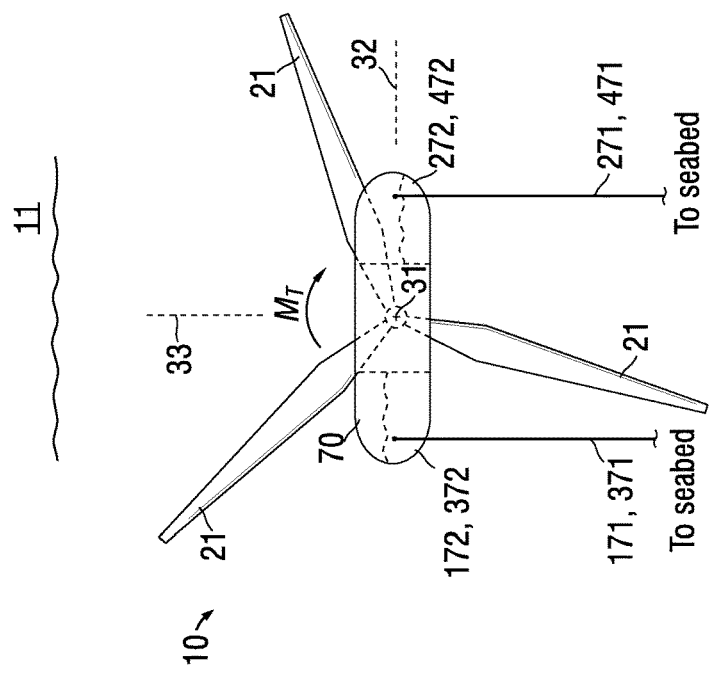
FIG. 8 illustrates one embodiment of the present invention from upstream view of the buoy with blades.

As shown in FIG. 8, if a $M_T$ about axis 31 causes the buoy's left side to ascend and right side to descend, tensions in cables 171 and 371 on the left side will increase while tensions in cables 271 and 471 on the right side will decrease. As the buoy losses levelness in the transverse direction, the internal ballast system is activated and water in the right, lower chambers 272 and 472 will be pumped to the left, higher chambers 172 and 372, which gradually restores the levelness of buoy 70 and reduces the tension difference between cables on the left side (171 and 371) and on the right side (271 and 471). As a result, chamber 172 and 372 have more ballast water than chambers 272 and 472 as shown in FIG. 8 after levelness of the buoy is restored.

Figure 9:
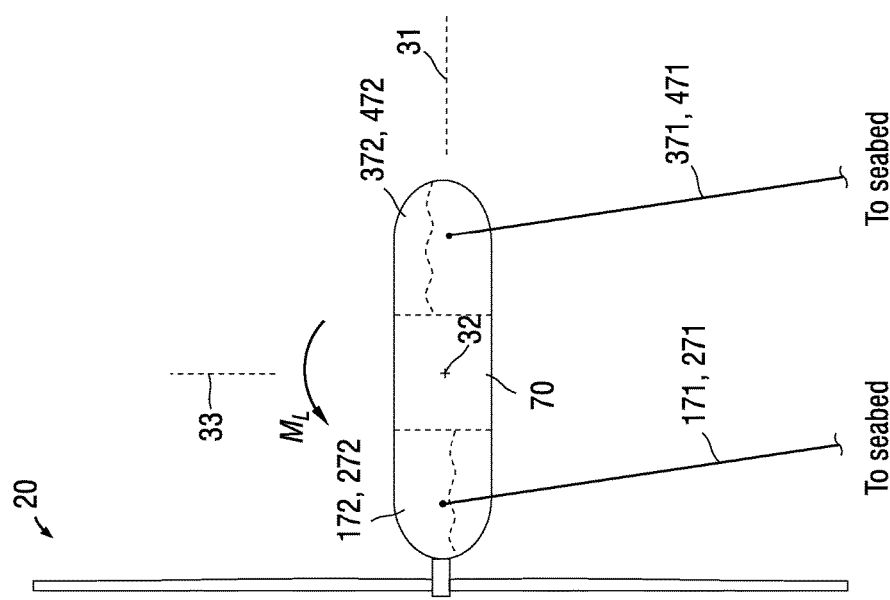
FIG. 9 illustrates one embodiment of the present invention in side view.

As shown in FIG. 9, if a $M_L$ about axis 32 causes the buoy's back side to ascend and front side to descend, tensions in cables 371 and 471 in the back row will increase while tensions in cables 171 and 271 in the front row will decrease. As the buoy loses levelness in the longitudinal direction, water in the front, lower chambers 172 and 272 will be pumped to the rear, higher chambers 372 and 472. The water movement gradually restore the levelness of buoy 70 and reduces the tension difference between the front cables 171 and 271 and the back cables 371 and 471. As a result, chamber 372 and 472 have more ballast water than chambers 172 and 272 as shown in FIG. 9 after levelness of the buoy is restored. Water movement is in the inverse direction if $M_L$ is in the direction opposite to that shown in FIG. 9.

$M_T$ and $M_L$ usually are both present; therefore water movements in the longitudinal and transverse directions occur at the same time. The amount of water in each chamber is generally different. Many of the above disclosed embodiments can be used in water condition where the flow 12 has no or very little direction change. When the direction change occurs, the device 10 will twist about the vertical axis 33. The tethering cables will no longer be parallel, and the buoy will lost levelness. The blades are not in the plane normal to the flow direction and even in danger of fouling the tethering cables. Therefore, for application in places with significant flow direction change such as in tidal streams, it is desired to minimize the twist moment about the vertical axis by introducing rotation capability of the turbine. Embodiments with this features are disclosed subsequently.

Figure 10:
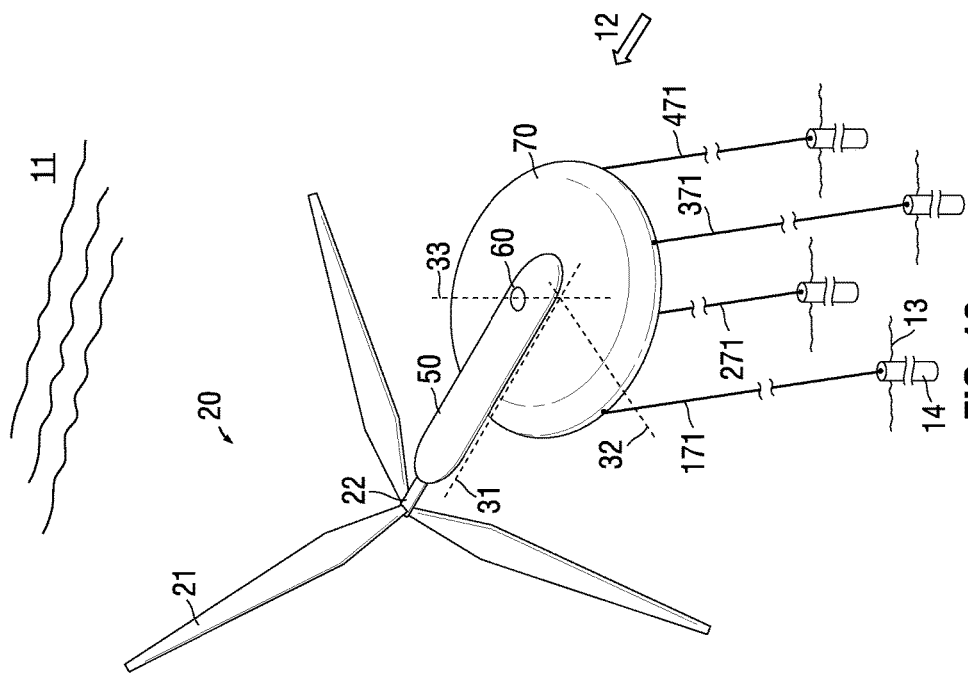
FIG. 10 illustrates one embodiment of the present invention in one quarter side view.

In one embodiment of the present invention, as disclosed in FIG. 10, two buoyant buoys are used, namely, a rotatable cylindrical shaped buoy 50 installed on top of a nonrotating, circular disk shape buoy 70 with the disk plane positioned horizontally. An axial shaft 60 perpendicular to disk plane of buoy 70 is rigidly connected to the center of buoy 70. Buoy 50 is also connected to shaft 60, however, the connection allows buoy 50 to rotate about shaft 60. Both buoys 50 and 70 have positive buoyancy. The blades 21 and shaft 22 are again assumed to be buoyancy neutral for the purpose of the discussion.

In several embodiments, turbine 20 is connected to buoy 50, which houses the electricity generator, gear box, controller, and all other mechanical and electric parts for electricity generation as known in the art. The generated electricity can be transmitted out through shaft 60 and buoy 70 before reaching the external transmission lines as known in the art (not shown). As the water flow changes direction, the top buoy 50 along with turbine 20 rotates accordingly about axis 33 so that the longitudinal direction of buoy 50 is always aligned to the water flow direction 12. The blades 21 of the turbines will always spin in the plane that is normal to the water flow direction 12. Buoy 70 also moves with the changing current direction 12 but mainly through translation.

In some embodiments, by allowing buoy 50 to rotate to always maintain alignment to the varying water flow direction 12, the rotational moment about the vertical axis 33 on buoy 70 is essentially eliminated. Only the moments about longitudinal axis 31 ($M_T$) and transverse axis 32 ($M_L$) need to be managed during operation. Axes 31 and 32 are the horizontal axes located in the central disk plane of buoy 70. Axis 31 and axis 32 are always aligned and perpendicular to the longitudinal direction of buoy 50, respectively, and thus change direction as buoy 50 rotates with the changing water flow direction 12.

Figure 11:
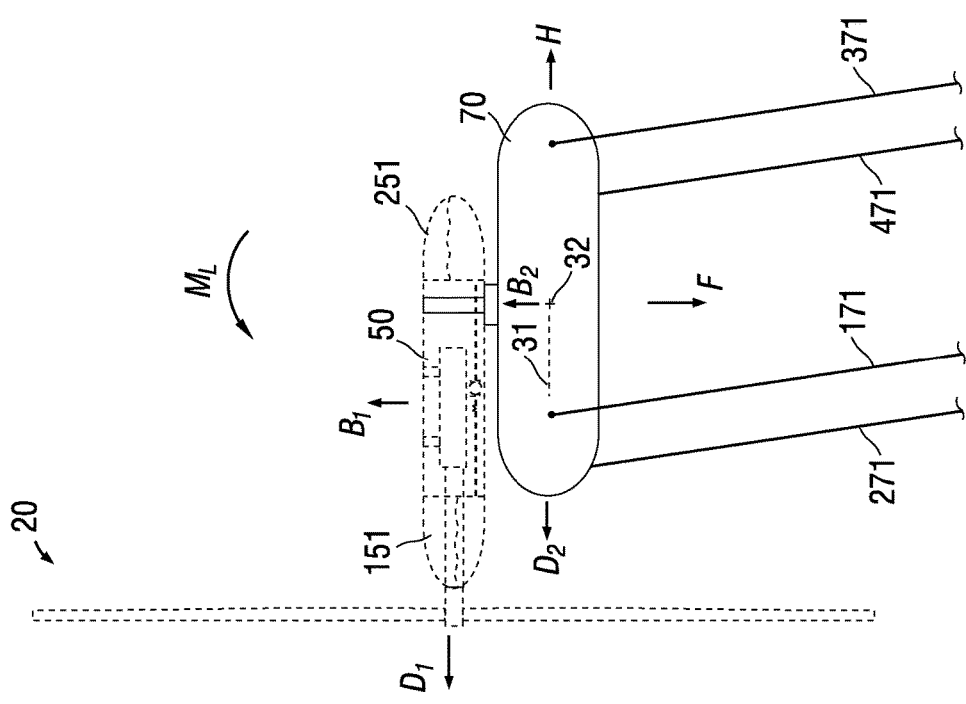
FIG. 11 illustrates one embodiment of the present invention in side view.

As shown in FIG. 11, in some embodiments, an overturning moment $M_L$ on buoy 70 about axis 32 is likely to be present all the time. Even when the velocity of the water flow is uniform, the center of drag force on turbine 20 and buoy 50, denoted by $D_1$ in FIG. 11, is likely to act at the level close to the center of buoy 50 and thus higher than axis 32 that is in the central plane of buoy 70. The tethering cables may be connected to points near the center plane of the buoy 70 where axes 31 and 32 are located. Therefore, $D_1$ will create a $M_L$ in the counter-clockwise direction about axis 32 on buoy 70. This moment can be partially countered using the buoyancy of buoy 50. As shown in FIG. 11 the buoyancy on Buoy 50, denoted by $B_1$, is located at the position that generates a moment in the clockwise direction about axis 32, which is opposite to the moment generated by $D_1$ about axis 32.

Additional counter moment can be provided by adjusting the CG location of the buoy 50 using an active ballast system inside buoy 50 with only two chambers at the two ends in buoy 50, as shown by chambers 151 and 251 in FIG. 11. The two chambers are connected by water pipes with valves and pumps. The CG location of buoy 50 can be dynamically adjusted in response to the variation of $M_L$ due to the change of flow velocity and distribution.

Figure 12:
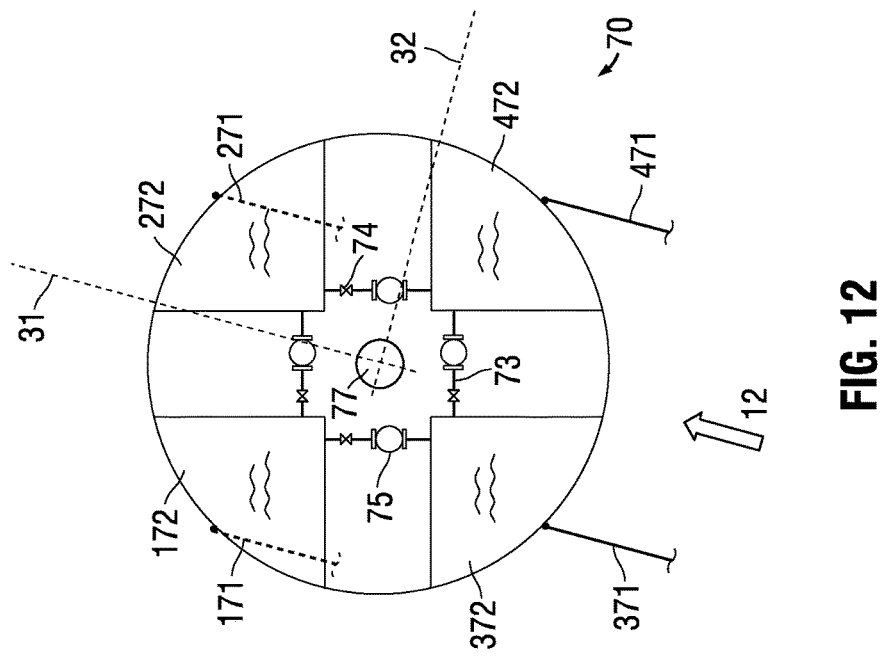
FIG. 12 illustrates one embodiment of the present invention in top view partial cross section of the buoy.

In some embodiments, additional resistance to $M_L$ comes from the combined use of differential tensions in cables 171, 271, 371 and 471, and the CG eccentricity resulting from ballast water movement in the active ballast system in buoy 70 following the same principle disclosed earlier. FIG. 12 shows the top view of the components inside buoy 70 in one embodiment. The internal partition of buoy 70 is similar to the embodiment shown in FIG. 7 except without the presence of the electrical generator, the gear box, and many other mechanical and electrical parts that are located in buoy 50. Rather, an anchor base 77 for shaft 60 is present at the center. Notice that the tethering cables are always aligned to water flow 12 in the horizontal plane. Axis 31 is the longitudinal direction of buoy 50 (not shown) and therefore is also always aligned to the water flow direction. Axis 32 also changes direction to remain perpendicular to axis 31 when flow direction changes. Moment $M_L$ causes buoy 70 to rotate about axis 32 and loss levelness in the direction along axis 31. If as a result the area in the downstream side of axis 32 descends and the area in the upstream side of axis 32 ascends, tensions in the downstream side cables 171 and 271 will decrease and tensions in the upstream side cables 371 and 471 will increase. If the overturning moment is large, the internal ballast system is activated to move the water from chambers in the descending downstream side 172, 272 to chambers in the ascending upstream side 372, 472. The tension difference in the cables are reduced and the levelness of buoy 70 is restored. The principle here is same as the one used in the embodiment shown in FIG. 7.

In some embodiments, $M_T$ is overturning moment about the longitudinal axis 31, caused primarily by the rotation of the blades 21. Resistance to $M_T$ comes from the combined use of differential tensions in cables 171, 271, 371 and 471, and the CG eccentricity resulting from ballast water movement in the active ballast system in buoy 70 following the same principle disclosed earlier. Refer also to FIG. 12, where axis 31 and axis 32 are aligned and perpendicular to the water flow direction 12, respectively. Moment $M_T$ causes buoy 70 to rotate about axis 31 and loss levelness in the direction along axis 32. If as a result the area in the left side of axis 31 ascends and the area in the right side of axis 32 descends, tensions in the left side cables 171 and 371 will increase and tensions in the right side cables 271 and 471 will decrease. If the overturning moment is large, the internal ballast system is activated to move the water from chambers in the descending right side 272, 472 to chambers in the ascending left side 172, 372. The tension difference in the cables are reduced and the levelness of buoy 70 is restored. The principle here is same as the one used in the embodiment shown in FIG. 7.

Figure 13:
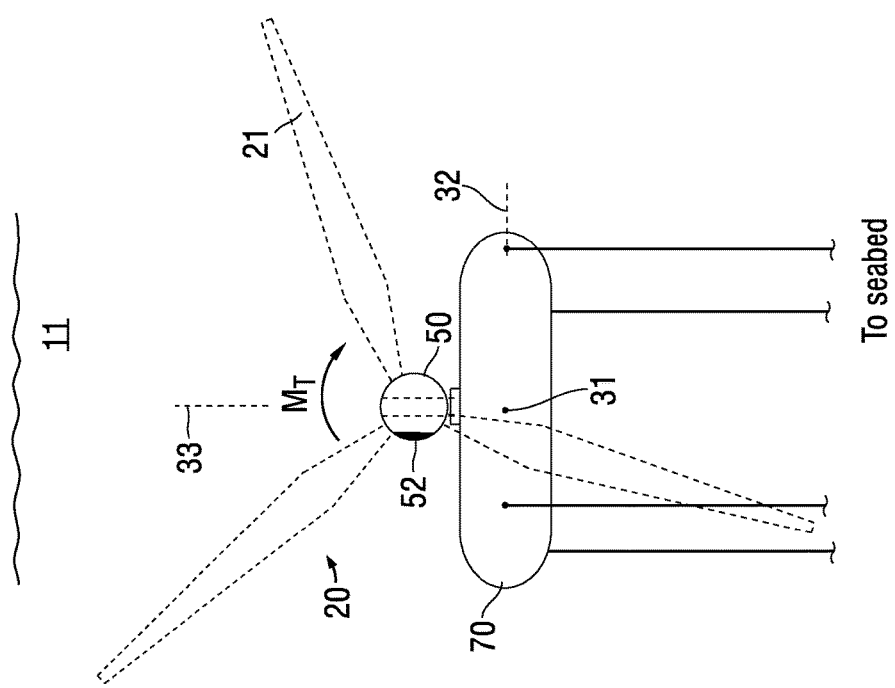
FIG. 13 illustrates one embodiment of the present invention from upstream.

As shown in FIG. 13, additional weight 52 can be added at the ascending side of buoy 50 due to $M_T$ to counter the moment as the direction $M_T$ with respect to buoy 50 does not change. In general, $M_L$ and $M_T$ are usually both present. The movements of ballast water take places in both directions at the same time, and the contents in all chambers are different.

Figure 14:
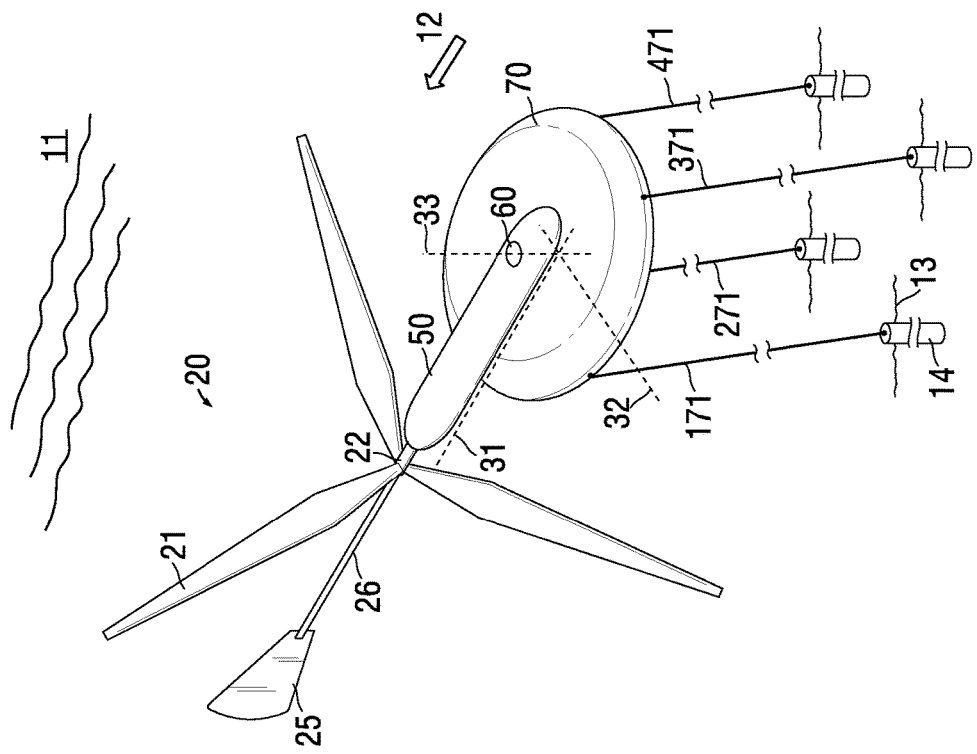
FIG. 14 illustrates one embodiment of the present invention in one quarter side view.

As shown in FIG. 14, in some embodiments, to help the turbine 20 and the top buoy 50 exhibit better response the direction change of the water flow, a weathervane 25 can be installed at the downstream. It is connected to the turbine through the use of the non-rotational axel member 26 that is aligned to the horizontal shaft 22. The blade of the weathervane 25 is always in the vertical plane. A small side pressure on the blade 25 will cause the turbine 20 and buoy 50 to rotate about shaft 60, making it sensitive to the change of the flow direction. The weathervane is especially helpful to rotate and align the device to the flow direction in the event of significant flow direction change, such as in tidal streams where the current direction reverses. It also reduces the potential rotational oscillation/vibration about the vertical axis, the irregular yaw movement due to flow turbulence. The weathervane if used needs to be located distant enough from the turbine blades 21 to avoid the turbulence cause by the movement of the blades.

In some embodiments, axel 26 and shaft 22 are coaxial, and shaft 22 rotates with the blades. One method to install the weathervane can be to use a hollow cylindrical member for shaft 22, which rotates outside the non-rotational axel 26. Axel 26 must be rigidly connected to the inside of buoy 50. The rotational movement of shaft 22 is transmitted to the power generator through the use of gears, bypassing the fixed connection base of axel 26 inside buoy 50. The weathervane 25 and the connecting member 26 can be made buoyancy neutral.

Another way to install the weathervane, in an alternative embodiment, can be to leave the connection joint between axel 26 and shaft 22 at downstream side of the blades. The two members have an overlapping segment that forms a joint. Rotation between the two members at the joint is allowed. The lower part of the weathervane blade 25 is made of material with much higher density than water, and the upper part of the weathervane blade 25 is made of light material that has positive buoyancy. The weathervane is therefore always in vertical position, and rotation of shaft 22 relative to the non-rotational axel 26 occurs at the joint during operation.

Figure 15:
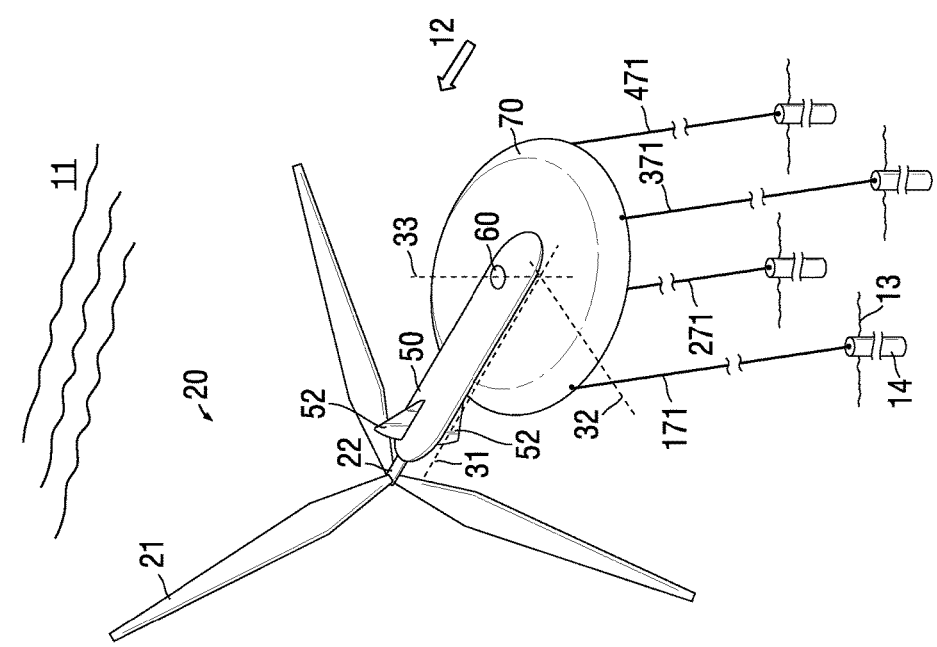
FIG. 15 illustrates one embodiment of the present invention in one quarter side view.

As shown in FIG. 15, an alternative to weathervane 25 is to add the vertical fins 52 near the downstream end of buoy 50. This embodiment is less sensitive to the water direction change, but may be a more economical solution if it is able to provide sufficient sensitivity to the flow direction change.

In several embodiments, the disclosed invention provides an apparatus that creates a large vertical working plane normal to the water flow direction. Although in each embodiment shown in FIGS. 1 to 15 the blades of a single rotary turbine occupy this vertical plane, other energy harvesting devices with different turbine types and numbers can be installed in the plane in lieu of the blades of the single turbine. For example, by modifying the embodiment shown in FIG. 14, a new embodiment is disclosed in FIG. 16 in which a plurality of horizontal-axis turbine assemblies 120 are connected to buoy 50 by struts or arms 127. Each turbine spins about its own axis and generate electricity in its own generator 128. The struts or arms 127 rigidly connect the turbine assemblies 120 to buoy 50 instead of spinning about axis 31. If opposite spin directions are used in the pairs of the turbines, the rotary torque about axis 31 on buoy 70 is significantly smaller than those in the single turbine embodiments shown in FIGS. 1 to 15. Therefore, the principles disclosed early on embodiments with single turbine are directly applicable to the less loaded device with multiple turbines such as the one shown in FIG. 16. Other embodiments shown in FIG. 1 to 15 can be modified similarly to use multiple turbines in lieu of single turbine.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

I claim:

1. A fluid submersed energy generating housing apparatus comprising:
    a buoy with a hollow interior housing space for equipment;
    a rotary turbine comprising a body, rotation blades in communication with said body, and an axis in a parallel direction to a fluid flow:
        said body being housed within said buoy and said rotation blades in communication with, said body are mounted on a downstream end of said buoy with respect to a flow direction of said fluid flow;
    a mooring system comprising equal length tethering cables wherein said tethering cables are parallel and of equal resistance capacity;
        said buoy being mechanically attached to said tethering cables;
    anchors mechanically attached with said tethering cables;
    an active ballast system with chambers and pumps located in the hollow interior housing space for equipment of said buoy;
        said active ballast system, with chambers and pumps further comprising a water weight movement system in internal active ballast system to counter balance rotational movements of said buoy;
    wherein said buoy with a hollow interior housing space for equipment is saucer shaped or comprises an assembly of cylindrical shaped hollow sections.

2. The fluid submersed energy generating housing apparatus of claim 1, wherein said equal length tethering cables comprise at least three in number.

3. The fluid submersed energy generating housing apparatus of claim 1, wherein said equal length tethering cables are arranged in a non-coplanar fashion.

4. The fluid submersed energy generating housing apparatus of claim 1, wherein
    said rotary turbine comprising blades and a body further comprises a multi-armed body, with multiple turbines.

5. A fluid submersed energy generating housing apparatus comprising;
    a first buoy with a hollow interior housing space for equipment;

a second buoy with a hollow interior housing space for equipment attached in rotational and mechanical communication with the first buoy;

a rotary turbine comprising body, rotation blades in communication with said body, and an axis in parallel direction to a fluid flow;

said body being housed within said second buoy and said rotation blades in communication with said body are mounted on a downstream end of said buoy with respect to a flow direction of said fluid flow;

a mooring system comprising equal length tethering cables wherein said tethering cables are parallel and of equal resistance capacity;

said first buoy being mechanically attached to said tethering cables;

anchors mechanically attached with said tethering cables;

an active ballast system with chambers and pumps located in the hollow interior housing space for equipment of said first and second buoys;

said active ballast system with chambers and pumps further comprising a water weight movement system in internal active ballast system to counter balance rotational movements of said first buoy and second buoy.

6. The fluid submersed energy generating housing apparatus of claim 5, wherein said first buoy with a hollow interior housing space for equipment is saucer shaped.

7. The fluid submersed energy generating housing apparatus of claim 5, wherein said second buoy with a hollow interior housing space for equipment is cylindrical shaped.

8. The fluid submersed energy generating housing apparatus of claim 5, wherein said second buoy with a hollow interior housing space for equipment is further comprised of a fluid weathervane attached to the exterior of said second buoy.

9. The fluid submersed energy generating housing apparatus of claim 5, wherein said equal length tethering cables comprise at least three in number.

10. The fluid submersed energy generating housing apparatus of claim 5, wherein a fluid weathervane attached distal to said second buoy and adjacent to said rotation blades.

11. The fluid submersed energy generating housing apparatus of claim 5, wherein said equal length tethering cables are arranged in a non-coplanar fashion.

12. A fluid submersed energy generating housing apparatus comprising;

a first buoy with a hollow interior housing space for equipment;

a second buoy with a hollow interior housing space for equipment attached in rotational and mechanical communication with the first buoy;

a rotary turbine assembly comprising a body with arms, a plurality of rotation blades in communication with said rotary turbine assembly;

said body with arms being partially housed within said second buoy and said plurality of rotation blades in communication with said rotary turbine assembly, in further communication with said body located external to said second buoy exude from the back of said second buoy;

said plurality of rotation blades are mounted on a downstream end of said buoy with respect to a flow direction of said fluid flow;

a mooring system comprising equal length tethering cables wherein said tethering cables are parallel and of equal resistance capacity;

said first buoy being mechanically attached to said tethering cables;

anchors mechanically attached with said tethering cables;

an active ballast system with chambers and pumps located in the hollow interior housing space for equipment of said first and second buoys;

said active ballast system with chambers and pumps further comprising a water weight movement system in internal active ballast system to counter balance rotational movements of said first buoy and second buoy.

13. The fluid submersed energy generating housing apparatus of claim 12, wherein said first buoy with a hollow interior housing space for equipment is saucer shaped.

14. The fluid submersed energy generating housing apparatus of claim 12, wherein said second buoy with a hollow interior housing space for equipment is cylindrical shaped.

15. The fluid submersed energy generating housing apparatus of claim 12, wherein said second buoy with a hollow interior housing space for equipment is further comprised of a fluid weathervane attached to the exterior of said second buoy.

16. The fluid submersed energy generating housing apparatus of claim 12, wherein said equal length tethering cables comprise at least three in number.

17. The fluid submersed energy generating housing apparatus of claim 12, wherein a fluid weathervane attached distal to said second buoy and adjacent to said rotation blades.

18. The fluid submersed energy generating housing apparatus of claim 12, wherein said equal length tethering cables are arranged in a non-coplanar fashion.

* * * * *